Stone & Collins,
Cotton Press.
N° 4,063. Patented May 29, 1845.
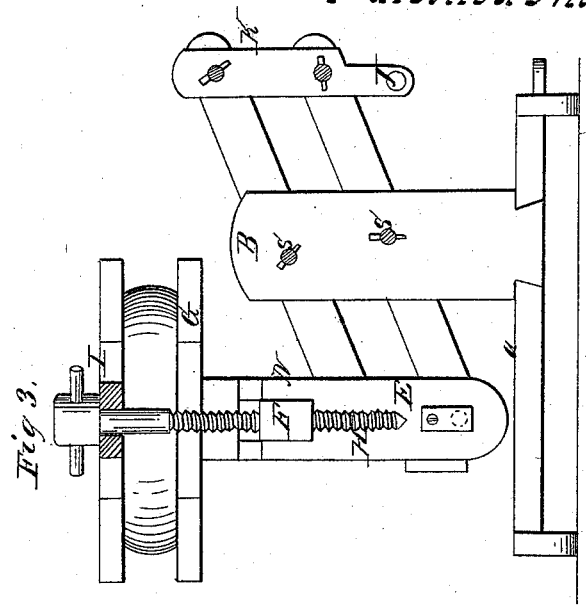
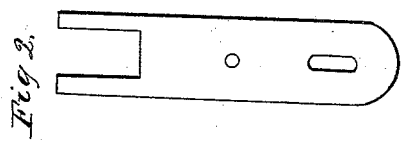
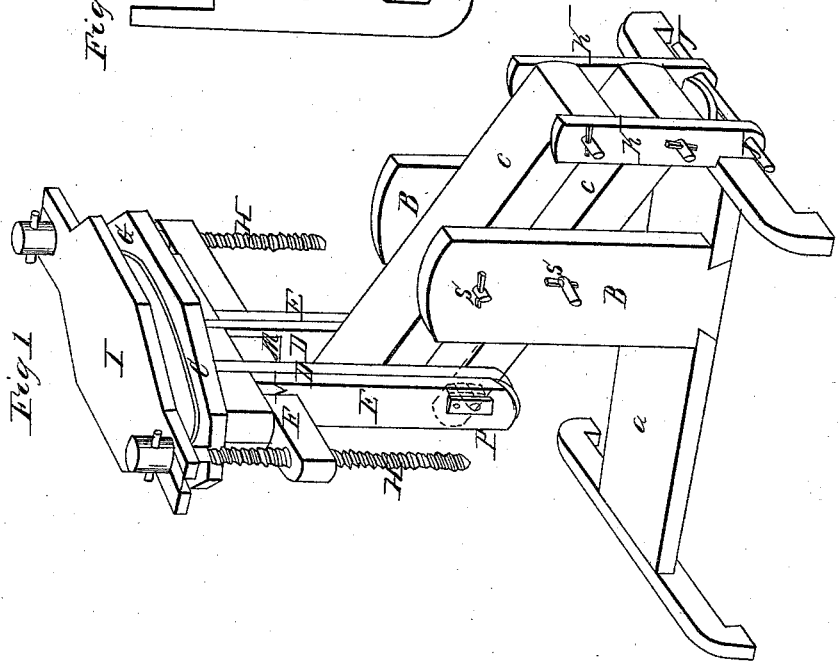

UNITED STATES PATENT OFFICE.

CHESTER STONE, OF ROOTSTOWN, AND GEO. S. COLLINS, OF RAVENNA, OHIO.

IMPROVEMENT IN SELF-ACTING PRESSES FOR CHEESE, &c.

Specification forming part of Letters Patent No. 4,063, dated May 29, 1845.

*To all whom it may concern:*

Be it known that we, CHESTER STONE, of Rootstown, in Portage county and State of Ohio, and GEORGE S. COLLINS, of Ravenna, in the county and State aforesaid, have invented a new and useful Improvement on our Machine for Pressing Cheese and other Substances; and we do hereby declare that the following is a full, clear, and exact description of the construction and operation of the same, reference being had to the annexed drawings, making part of this specification.

Figure 1 is a perspective view of the press when raised and secured to receive the cheese. Fig. 2 is a sectional view. Fig. 3 is a side view of the press in the position of pressing the cheese.

This machine consists of—

First. A foot-piece, $a$, having cross-pieces framed to the end sufficient to support the machine in an upright position.

Second. Two stanchions, B B, the lower ends of which are fastened firmly to opposite sides of the base. These stanchions have two pivots, S, one placed below and to the right of the other. It will be noticed that the power of this press is caused by placing the lower of these middle pivots farther back or toward the nearest end of the base than the upper pivot is placed.

Third. Two levers, C C, are placed between the stanchions and parallel to the base, the upper lever having a pivot-hole through its center edgewise, which receives the upper pivot of the stanchions, the lower lever having a pivot-hole one-half inch from its center toward the back end to correspond to the lower pivot of the stanchions. The levers have also pivots the same size one and one-half inch from the ends, equally distant from the upper and lower sides.

Fourth. Two inner guide-pieces, D D, are placed on opposite sides of the forward ends of the levers, under the form or cheese board, having a mouth, M, cut out of the top for the beam F to move in—say wide enough to permit the easy play of a beam therein. These inner guide-pieces have a pivot-hole, Q, directly under the center of the mouth, equally distant from either edge of the pieces, and the center being two and three-eighths inches below the mouth. They have also a pivot-mortise, P. This mortise receives the forward pivot of the lower lever.

Fifth. Two outer guide-pieces, E E, placed outside of the inner guide, having also a mouth, N, cut out of the top sufficient to receive the beam, to which they are made fast by rivets passing through both, and by gluing. These outer guides have a pivot nine inches below the center of the lower side of the beam, which receives the forward pivot of the lower lever.

Sixth. A beam, F, made fast to the outer guide-pieces, as above stated, and having screw-boxes through the ends sufficient to receive the screw from above and two inches from their centers to ends of beam.

Seventh. There is on the top of the upright a form or cheese board, G, having a channel around the top to conduct off the whey or other liquid, having a batten made fast to the lower side of the form with screws. This batten has four mortises which receive the tops of the inner guides, being sufficiently deep to permit the tops of the guides to come within three-quarters of an inch of the form.

Eighth. Two screws, H H, having heads, pass through the beam, as above stated.

Ninth. A follower, I, passes from one screw to the other over the cheese or substance pressed, having a mouth cut out of each end sufficient to permit it to slip on or off from the screws at pleasure.

Tenth. Two tie-pieces, K K, are placed on opposite sides of the levers at their back ends—say, thirteen inches long, three wide, and one and one-half thick—having two pivot-holes, the center of the lower being four inches from the bottom of the pieces, and the center of the upper being six inches above the first. These holes receive the pivots of the back end of the levers. These pieces have also a hole through their lower ends to receive a pin, J, when the press is elevated, to secure it in an elevated position.

In using this press the back ends of the levers are pressed down until the lower one strikes the base, which will bring the form or cheese board up to its most elevated position. The press is then secured in this position by passing a pin, J, through the lower holes of the tie-pieces under the projecting tenant of the base, as shown in Fig. 1. The follower is then removed from the press, and the cheese or other substance is placed upon the form in a hoop. The follower is then replaced and a light pressure given with the screws, after which the pin is removed from the ties, and the lever power of the press is left to bear upon the weight to be pressed, when the levers will assume the position represented in Fig. 3.

Having now dwelt somewhat at length upon the difference in form and principle of this new machine, but little need be added to show its superiority to the other in its practical application. The first advantage we shall mention is its superiority to our former machine in strength. It will be noticed that our former machine has the two points of pressure at the pivots in the outer extremity of the lower lever very near each other, and what makes it still worse is that the pressure at these two points is in opposite directions. This brings the whole power of the machine upon each of these pivots in such a manner as to render it extremely difficult to prevent the levers splitting at these points. Rivets have been employed, but the swelling and shrinking of the timber of the lever, by exposure to the usual damps of the cheese-room, has a tendency to loosen the rivets and leave the lever to split at these points, which at once spoils the machine. This was the first serious difficulty experienced in attempting to introduce our former machine. Employing iron levers was found to be impossible, as they were beyond the reach of most of our mechanics in the dairying districts, and even where they might have been obtained, the increased weight of the machine (which should be light and easily portable) and the great increase of expense rendered the introduction of iron to any extent wholly impracticable, besides the distance from the center of one pivot to the center of the other cannot be over one inch and a quarter without enlarging the machine to a very inconvenient size. In our new machine, on the contrary, there are no two points of pressure near each other, and so entirely is this difficulty removed that, without riveting, the simple bar of wood has been found sufficient to sustain the greatest pressure required without enlarging the machine.

The next difficulty we shall mention in our former machine is one which seriously affects the durability of the machine, and arises from the same part of the construction—that is, the rapid wear of the levers by the pivots. These pivots are necessarily placed so near each other that they need to be small to save the strength of the lever as much as possible, and, being necessarily of iron, the wood of the lever is rapidly cut away by them, and, as the construction renders the use of iron boxes for the pivots to move in difficult and expensive, new levers are soon found to be necessary. In our new press this difficulty is also obviated. As there are no two pivots near each other, either one of them may be enlarged to any desirable extent, and thus the rapid wear of the wood prevented.

The third difficulty to be noticed in our former machine is one which in no way can be entirely removed without abandoning the principle on which that machine is constructed; but this difficulty is also entirely removed by the construction of our new machine. It will be noticed that the pivots move in different circles, of which circles the pivot in the post being the center or axis. Now, as the outer pivot is attached to the frame-work which passes over the substance to be pressed, and the inner pivot is attached to the rising and falling post upon which the cheese (or other substance to be pressed) rests while pressing, of course the pressure will not be even unless the pivots carry the upright post of the machine to which they are respectively attached parallel to each other; but as the pivots move in different circles, the upright posts to which they are attached are carried out of a parallel to each other, and thus the tendency to press the cheese on one side more than the other. This variation in a model is very small; but in a large press it is greatly increased, and as the press wears it becomes worse, and when a one-sided pressure has commenced the different joints of the machine are all strained to one side, to make the difficulty much worse than the motion of the press would indicate when it is not pressing. In our own new press it will be seen that both of these upright parts are guided by the same pivot, and thus the parts are all kept exactly parallel to each other. Hence this serious defect is entirely obviated.

The next and last difficulty in our former press which we shall now notice is that experienced in raising the falling part of the machine when it has settled down in pressing. This is done with a hand-lever, as shown by Fig. 3. The hand-lever is found to be decidedly the best means for this purpose, yet so serious is this difficulty that in pressing a large cheese the strength of a strong man is required to raise our former machine without severe effort, and what makes this difficulty more serious is the fact that the presses of greater power than ordinary are required in some of our best dairies. This requires longer levers, and of course makes the labor very severe where women are employed in this department, as is the case extensively. Our new press, however, so greatly obviates this difficulty that in presses of the greatest power and in pressing the largest cheeses it is found to be easy even for women to elevate the machine with the cheese on.

What we claim as our invention, and desire to secure by Letters Patent, is—

The manner of arranging the pivots S, in combination with the levers C and bars K and guides or arms D E, operating in the manner and for the purpose set forth.

CHESTER STONE.
GEO. S. COLLINS.

Witnesses:
THOMAS H. WHITMORE,
ANDREW McBRIDE.